(12) United States Patent
Hattar et al.

(10) Patent No.: US 10,278,342 B2
(45) Date of Patent: May 7, 2019

(54) SPRINKLER AND A GROUP OF SPRINKLERS FOR IRRIGATING AREAS OF ARBITRARY SHAPE

(71) Applicant: Hattar Tanin LLC, Novato, CA (US)

(72) Inventors: Saadeh Hattar, Novato, CA (US); Volodymyr Tanin, Kiev (UA)

(73) Assignee: Hattar Tanin, LLC, Novato, CA (US)

( * ) Notice: Subject to any disclaimer, the term of this patent is extended or adjusted under 35 U.S.C. 154(b) by 298 days.

(21) Appl. No.: 15/348,853

(22) Filed: Nov. 10, 2016

(65) Prior Publication Data

US 2017/0127625 A1    May 11, 2017

Related U.S. Application Data

(60) Provisional application No. 62/253,344, filed on Nov. 10, 2015.

(51) Int. Cl.
*B05B 3/02* (2006.01)
*A01G 25/16* (2006.01)

(52) U.S. Cl.
CPC .............. *A01G 25/16* (2013.01); *B05B 3/02* (2013.01); *Y02A 40/237* (2018.01)

(58) Field of Classification Search
CPC ............ A01G 25/16–25/167; B05B 3/02–3/12
See application file for complete search history.

(56) References Cited

U.S. PATENT DOCUMENTS

| 2006/0011742 A1* | 1/2006 | Mallela | ................ B05B 1/1636 239/200 |
| 2015/0144716 A1* | 5/2015 | Barmoav | ................ B05B 1/265 239/500 |

\* cited by examiner

*Primary Examiner* — Amar Movva
(74) *Attorney, Agent, or Firm* — KW Law, LLP

(57) ABSTRACT

A system for irrigating an irregularly shaped area including a sprinklers and an electronic device in wired or wireless communication with the sprinkler. The electronic device has a processor and a memory storing programmable instructions causing the sprinkler to irrigate watering sectors according to predefined watering parameters, such that an irregular irrigation pattern is achieved.

17 Claims, 8 Drawing Sheets

SPRINKLER AND A GROUP OF SPRINKLERS FOR IRRIGATING AREAS OF ARBITRARY SHAPE

CROSS REFERENCE TO RELATED APPLICATIONS

This application claims priority to U.S. Provisional Patent Application No. 62/253,344, entitled "Sprinkler and a Group of Sprinklers for Irrigating Areas of Arbitrary Shape," filed Nov. 10, 2015, the content of which is hereby incorporated by reference in its entirety for all purposes.

TECHNICAL FIELD

This specification describes technologies relating to sprinkler systems for irrigating irregular areas.

BACKGROUND

In the current time, with growing world population we are able to increase nearly everything. We can produce more energy, grow more food, . . . making everything this with more effective, enhanced technologies, improving the ways and methods from day to day.

The only resource which can't be produced in bigger quantities—it is land. It is especially important and true for the agriculture. As we are paying same fixed taxes for the each land piece, from the land-use effectiveness the rate of profit depends crucially. Areas with limited access to water resources can't generate water from nowhere that is why rational use and water-saving can guaranty not only lower expenses, but survival.

SUMMARY

The following presents a summary of the present disclosure in order to provide a basic understanding of some of the aspects of the present disclosure. This summary is not an extensive overview of the present disclosure. It is not intended to identify key/critical elements of the invention or to delineate the scope of the invention. Its sole purpose is to present some of the concepts of the present disclosure in a simplified form as a prelude to the more detailed description that is presented later.

Various embodiments of system for irrigating an irregularly shaped area and methods for irrigating an irregularly shaped area are within the scope of the appended claims, each has several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

Sprinkler able to irrigate area of any/arbitrary shape. The sprinkler which is programmable and/or adjustable to have different range of watering at different angle (e.g., between or within different watering sectors) depending on the shape of irrigated zone. The sprinkler may or may not have remote control. Watering range can be changed by using control valve that changes pressure, adjustable nozzle(s) or nozzle(s) with changeable trajectory, one or more sprinkler heads or by all these means or any combination of them; uniformity of watering may be provided by adjustment of rotation speed of sprinkler head. In some embodiments, the sprinkler may have several nozzles and/or heads and is able to leave dry zones of any shape inside the irrigated area. In some embodiments, the sprinkler is able to take into account terrain profile and wind strength and direction. In some embodiments, the sprinkler can be a part of a group of the same systems that can be managed from the single remote control to operate as a unit.

This brought us to the idea, that there is high necessity to provide the farmers and people who live in limited-access-to-water-areas with solid solution in the sphere of irrigation, which will provide them with possibility to use the whole territory with no empty, dry and unused zones, like now (FIG. 1, marked with white circles) and/or without overlapping of watering zones from adjacent sprinkler-heads, preventing local overwatering (double, triple . . . watering of the same zone, when general watering of area is in two, three . . . times less).

That is why we propose irrigation technology with sprinkler(s) (i.e. any devices for watering on the distance [including, but not limited to, like spraying sprinkler head or watch-hand-type beam with multiple controlled/smart-controlled sprayers/sprinkler devices along it], hereinafter named as sprinkler(s)), which can be adjusted/regulated to water zone/area of any form/shape, providing/applying water to desired surface of the watered zone, being framed/bordered by the specified perimeter line of this watered/irrigated zone.

Sprinkler is able to irrigate area of any and/or arbitrary shape. The sprinkler is programmable to have different range (i.e. distance of action/distance of operation, hereinafter named as range) of watering at different angle (direction) depending on the shape of the irrigated zone. Range-Angle program can be entered manually at the site or from remote control. Remote control may be represented by any device connected to the sprinkler by wire or wirelessly. It may be any special device as well as a computer, notebook, tablet, smartphone, etc. with special software installed. The program may be also calculated by special software from the map or scheme of the irrigated zone. Watering range can be changed by using control valve that changes pressure, adjustable nozzle or nozzle with changeable trajectory or by all these means or any combination of them, other variants are also possible. Since the amount of water depends on range/water-pressure, watering time, rotation speed of sprinkler—angle program may be also prepared automatically. The sprinkler may also have several nozzles.

In some embodiments, the sprinkler may have several nozzles (one or more) and/or heads (one or more) and be able to leave dry zones of any shape inside the irrigated area. In some embodiments, the sprinkler is able to take into account terrain profile and wind strength and direction. In some embodiments, the sprinkler can be a part of a group of the same systems that can be managed from the single remote control to operate as a unit.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

Figure 4:
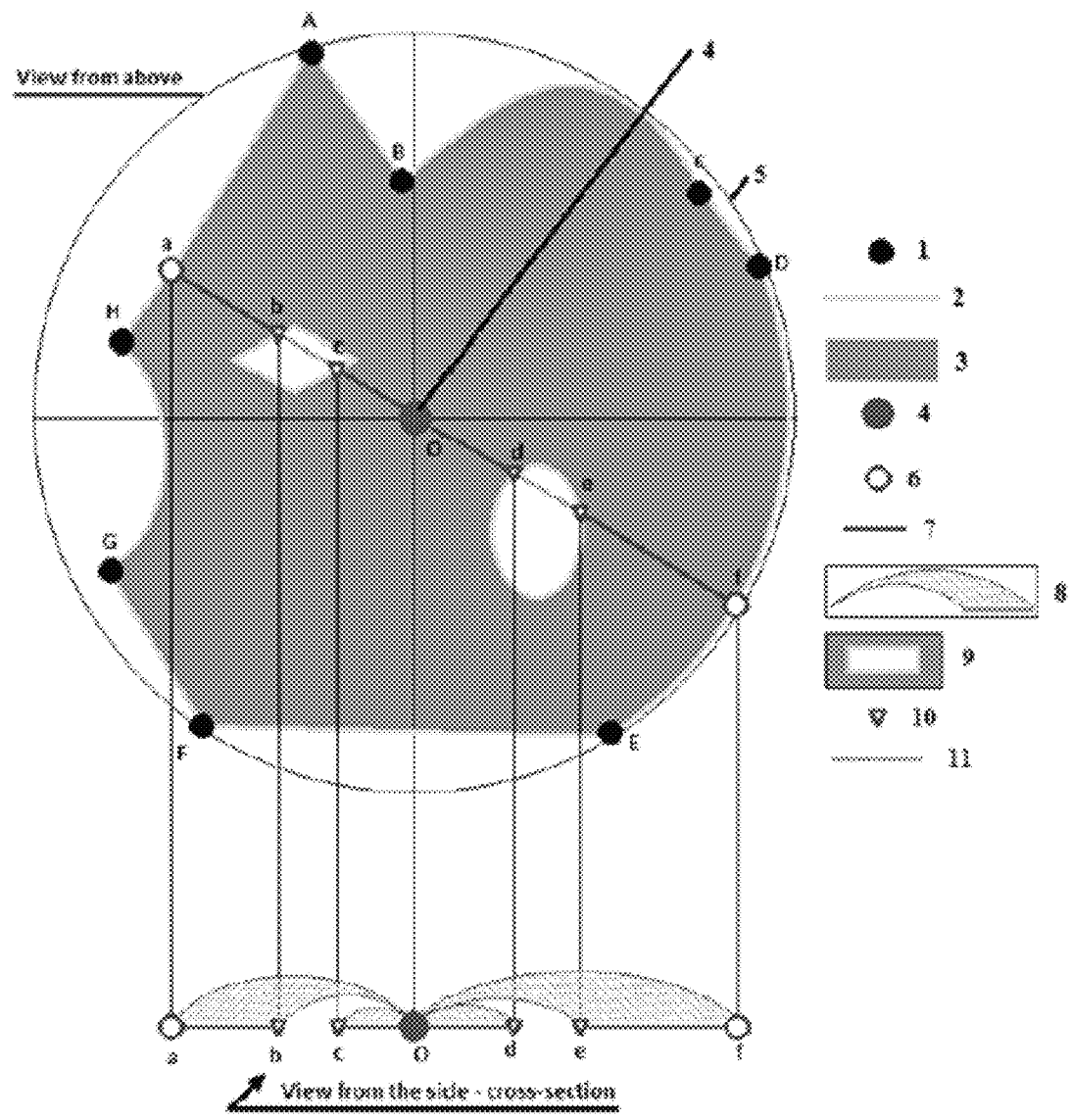

FIG. 4 illustrates an exemplary irregular watering pattern made possible by the irrigation systems disclosed herein, according to one embodiment.

Figure 5:
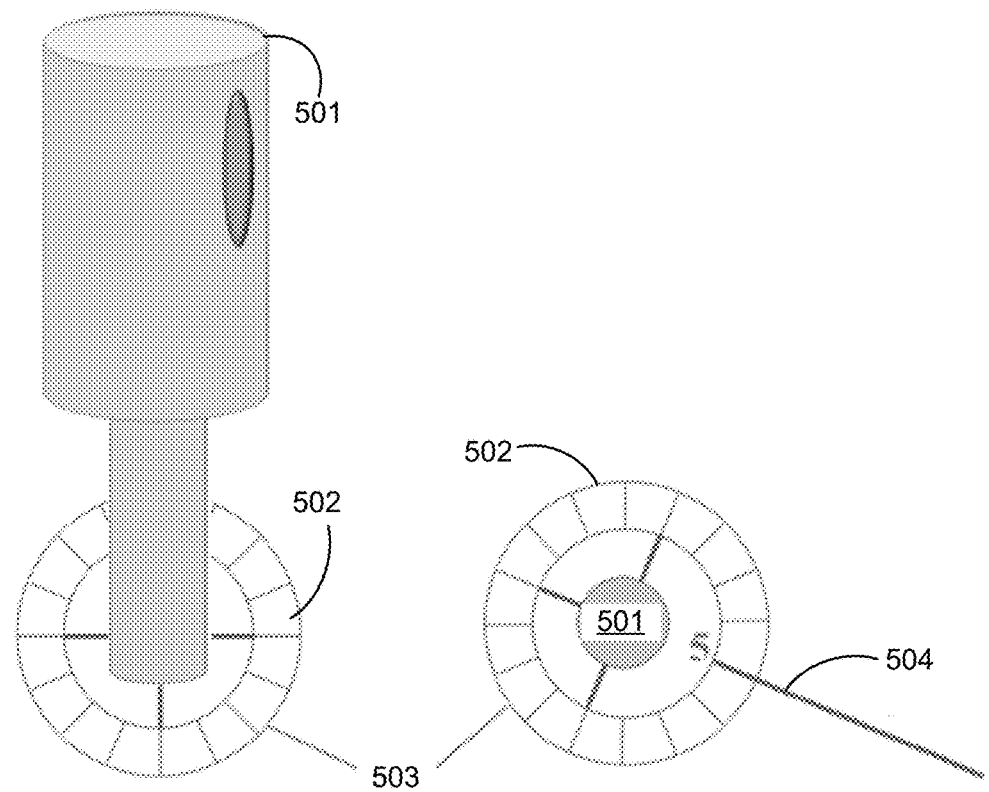

FIG. 5 illustrates adjustment of a perimeter line with a tape measure, according to one embodiment.

Figure 6:
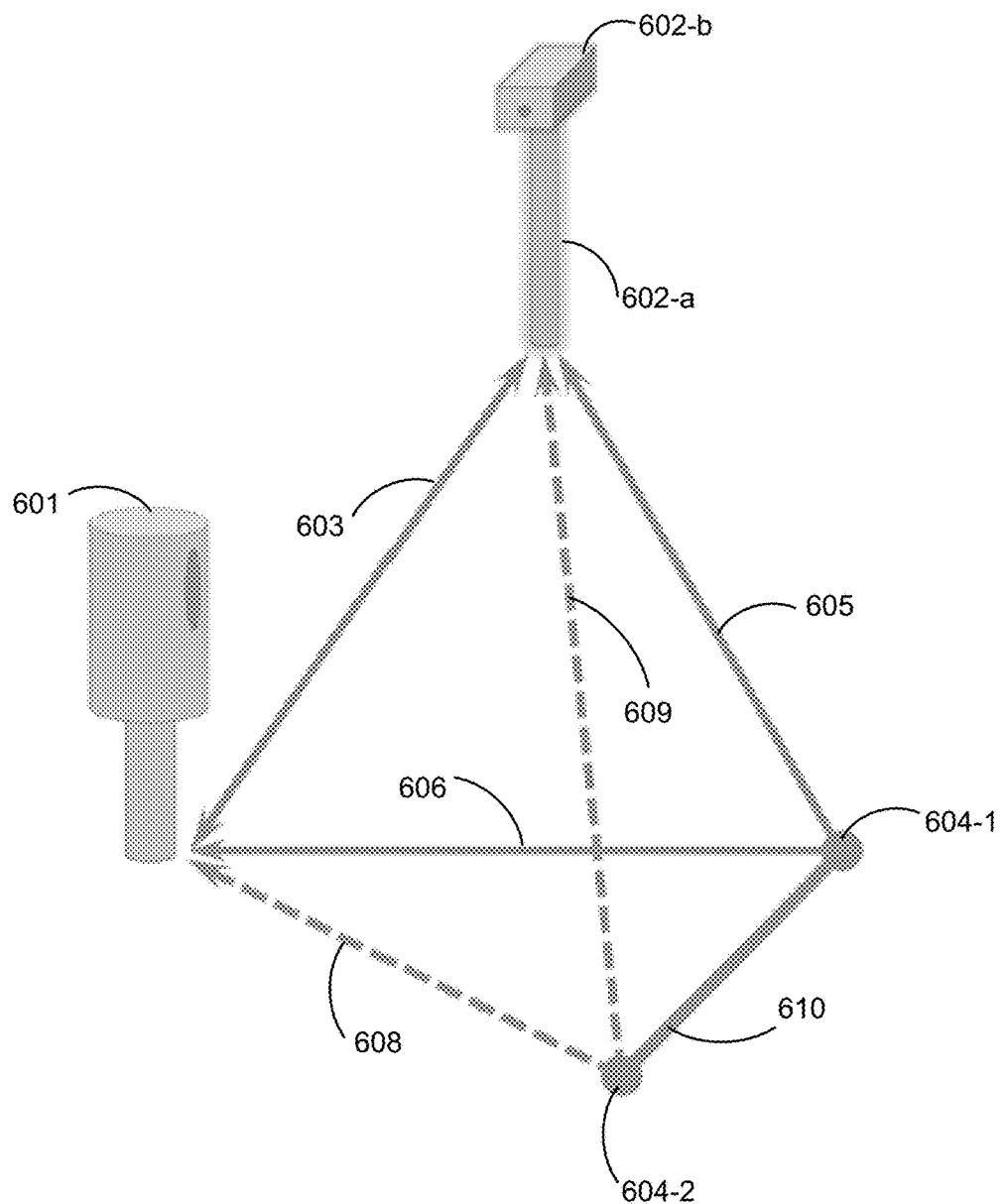

FIG. 6 illustrates adjustment of a borders watering line for an irregular watering pattern with a rangefinder and benchmarking device, according to one embodiment.

Figure 7:
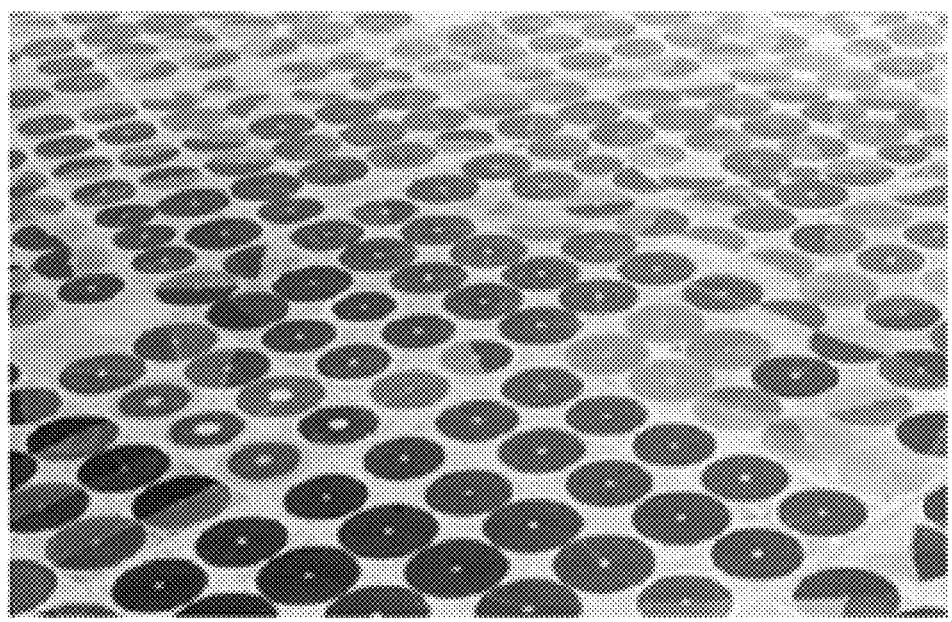

FIG. 7 shows an array of square agricultural fields, each watered in a circular pattern.

Figure 8:
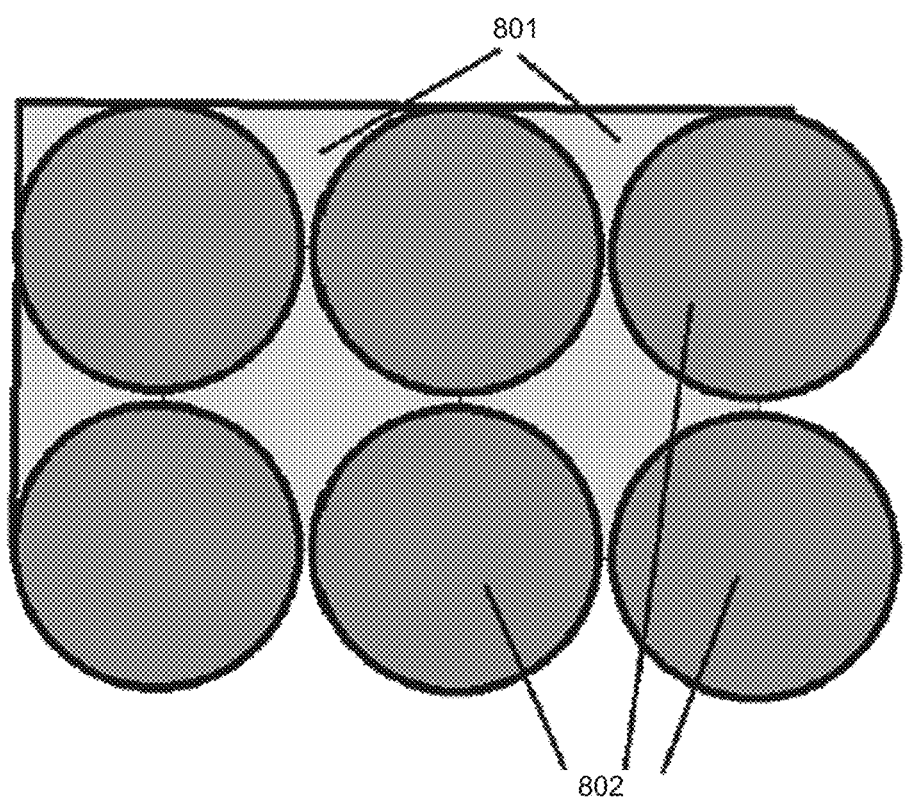

FIG. 8 illustrates a square configuration of circular sprinklers used to irrigate an array of square agricultural fields.

Figure 9:
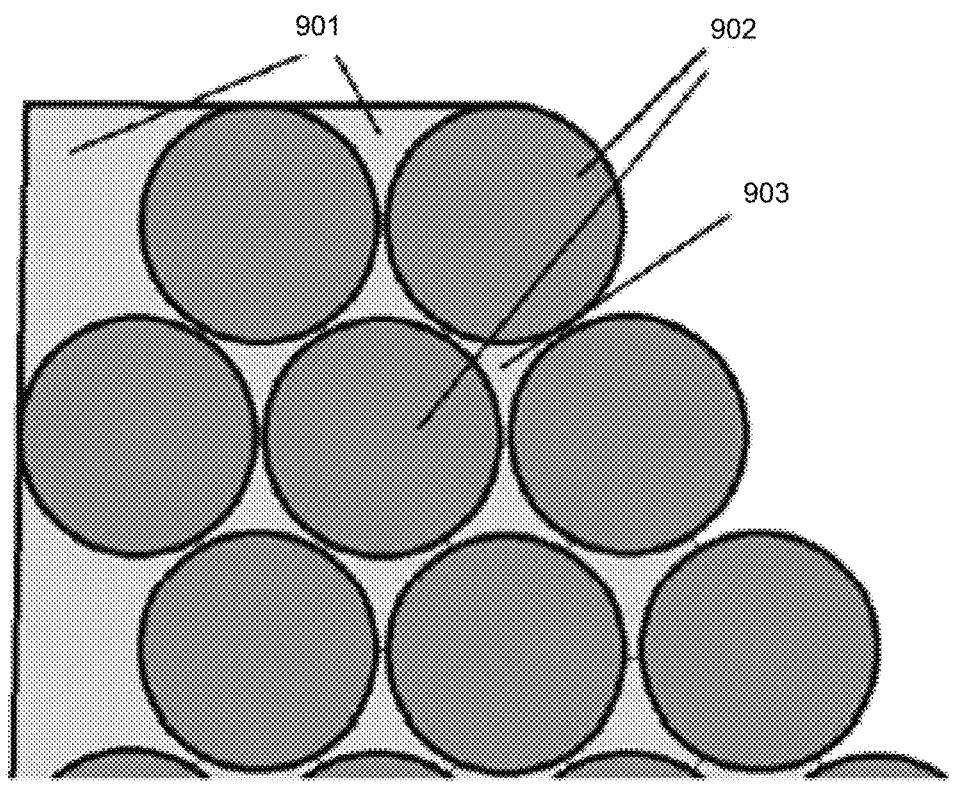

FIG. 9 illustrates a triangular configuration of circular sprinklers used to irrigate an array of square agricultural fields.

DETAILED DESCRIPTION

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
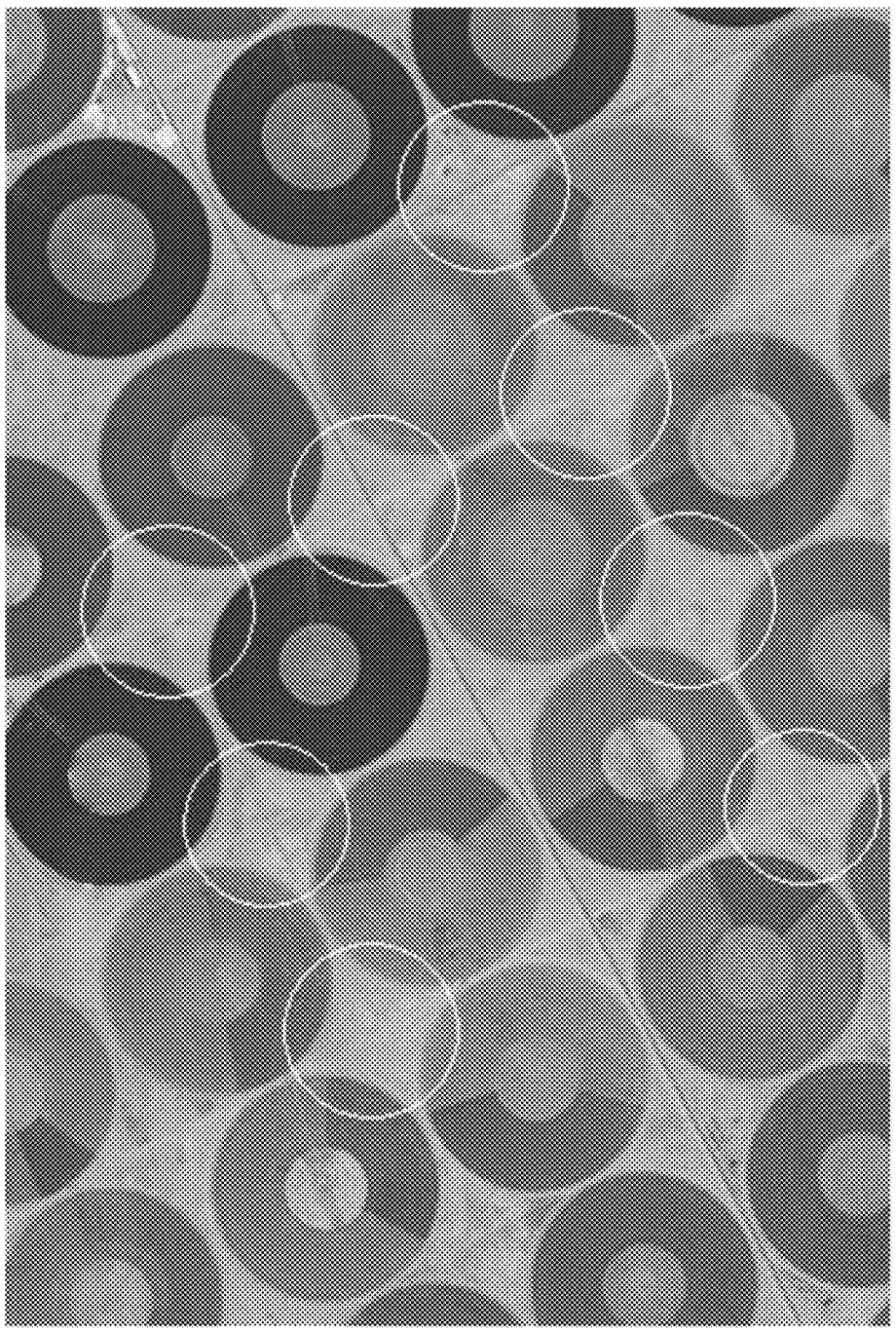
FIG. 1 shows a typical irrigated field. Irrigated areas are shown as dark circles, the remaining area is not used.
Figure 2:
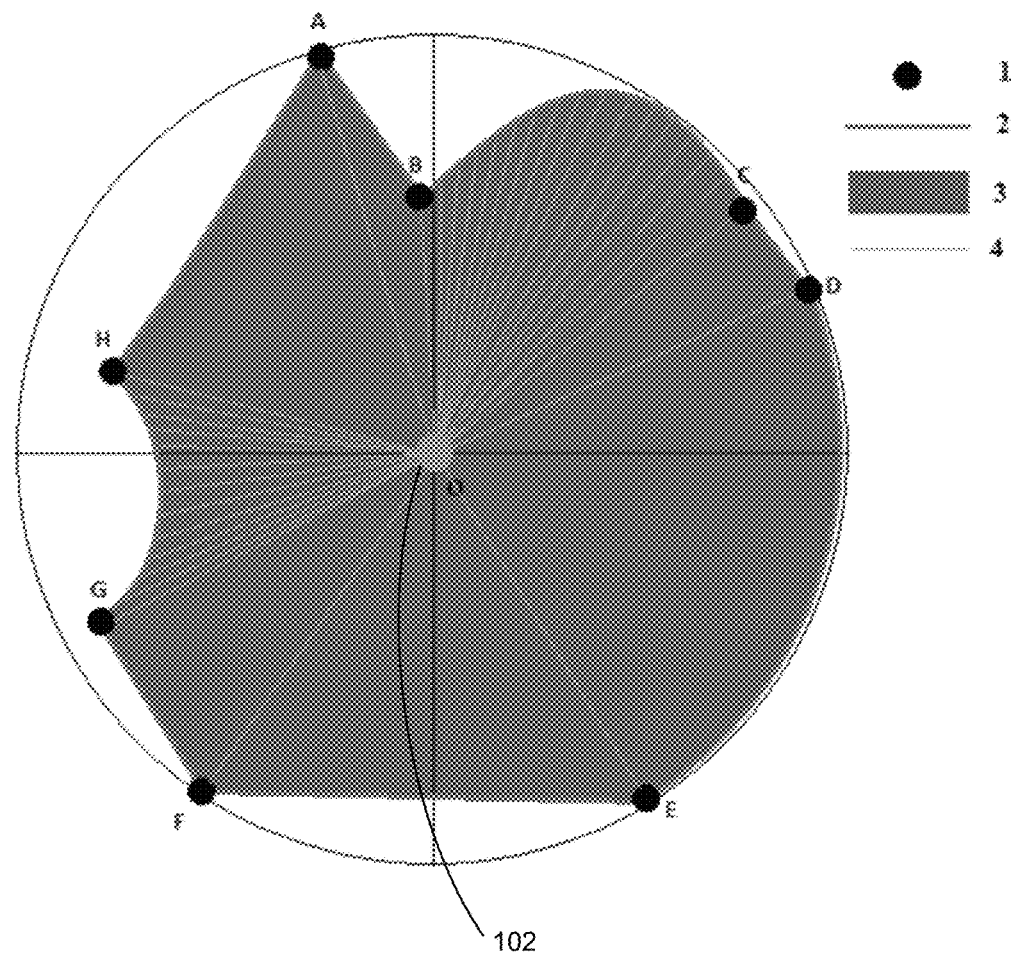
FIG. 2 illustrates an exemplary irregular watering pattern made possible by the irrigation systems disclosed herein, according to one embodiment.

In one aspect, the disclosure provides irrigation systems and methods for irrigating that allow irregular watering patters, as illustrated in FIG. 2. The irrigation systems disclosed herein can be manually or automatically adjusted and/or programmed to irrigate only within predefined parameters. In certain embodiments, this is achieved by regulating the direction and/or water flow of each sprinkler within the irrigation system.

In some embodiments, the disclosed methods and irrigation systems allow irrigation of complex-shaped irrigated zones, for example, as illustrated in FIG. 2. In FIG. 2, sprinkler 102 ("o") creates irregular watering pattern 3 (filled blocks) by dividing the circumscribed area into a plurality of sectors, defined by posts 1 (A through H). For example, sector ABO with terminal border line AB, sector CDO with terminal border line CD, sector EFO with terminal border line EF, sector FGO with terminal border line FG, and sector HAO with terminal border line HA. Each terminal border may have a different shape (e.g., convex, concave, or linear). Lines 2 define the boarder for each sector.

In some embodiments, perimeters having irregular shapes by be defined in a polar coordinate system, wherein the sprinkler is located at the pole and each point on the perimeter is defined by a distance from the pole and an angle from a reference direction (e.g., due east from the pole). Points of the perimeter and respective radii (distances to them) are illustrated as line 4, in FIG. 2. In some embodiments, distances to perimeter points define the range of watering in the respective direction. A watering perimeter of any shape may be defined by a number of such points serving as nodes. The perimeter between such nodes may be approximated by linear interpolation, spline, or other interpolation involving neighboring nodes. More complex perimeters will require more careful measurement, e.g., to define a higher density of nodes in areas of irregularity.

The sprinkler is programmable to have different range (radius) of watering at different angle depending on the shape of irrigated zone. Angle-Range program can be obtained from a perimeter described above. Uniformity of watering may be provided by adjustment of rotation speed of sprinkler to change of watering radius.

Angle-Range program can be entered manually at the site or from remote control. Remote control may be represented by any device connected to the sprinkler by wire or wirelessly. The speed of rotation may be fitted/calculated automatically, coming from specified angle-range program. It may be any special device as well as a computer, notebook, tablet, smartphone, etc. with special software installed. The program may be also calculated by special software from the map or scheme of the irrigated zone. In this case program may be obtained for any shape of the irrigated zone. Range between the nodes may be changed by linear interpolation, spline interpolation, or another interpolation involving neighboring nodes. Some sectors may be left without watering. This is also defined in the program. Since the amount of water may depend on range (radius), watering Angle-Time (rotation speed) program is also automatically prepared. This makes a Time-Rotation Speed-Range program suitable to manage the sprinkler.

The sprinkler may operate according to a Time-Rotation Speed-Range program, where speed of rotation and range of watering are changed according to a predefined program.

In other embodiments the sprinkler may not have a predefined Time-Rotation Speed-Range program. The sprinkler may change watering time and range upon reaching some angle, which is determined by sensors and sensor integration. Uniformity of watering may be also provided by adjust of sprinkler rotation speed.

There is also function for sprinkler to direct water to the segment in such way, that it will reduce the influence of the wind, if it is, and/or in case, when there is any deviation, which may not be corrected—to change speed of sprinkler rotation, time of the water application to the exact zone(s) and/or location of water delivery to provide uniform water application/delivery by the whole watered/irrigated zone.

The sprinkler can be programmable to have different range (radius) of watering at different angle depending on the shape of irrigated zone. Range-Angle program can be entered manually at the site or from remote control. It may be also a Range-Time (and/or Range-Speed/Range Time-Speed) program for a rotating sprinkler with constant/changeable/adjustable speed of rotation. Remote control may be represented by any device connected to the sprinkler by wire or wirelessly. It may be any special device as well as a computer, notebook, tablet, smartphone, etc. with special software installed. The program may be also calculated by special software from the map or scheme of the irrigated zone. In this case program may be obtained for any shape of the irrigated zone. Range between the nodes may be changed by linear interpolation or by spline or other interpolation involving neighboring nodes. Some sectors may be left without watering. This is also defined in the program.

Figure 3:
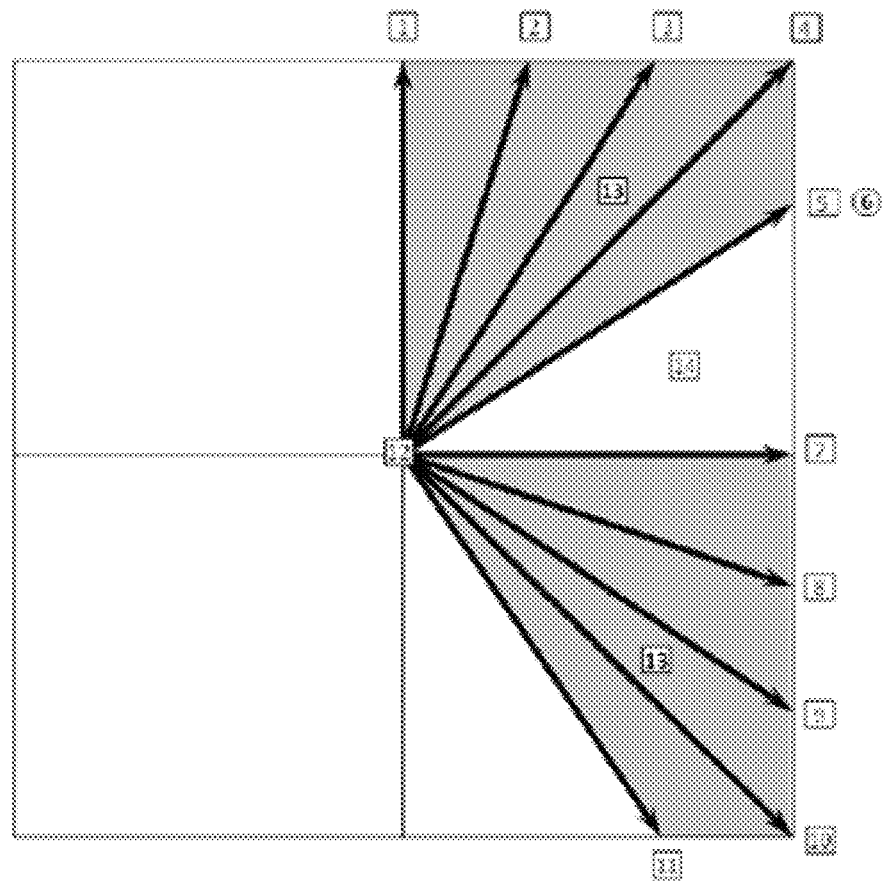
FIG. 3 illustrates programming of an exemplary irregular watering pattern using an Angle-Range program with 15° step function, for watering parts of a 200 foot by 200 foot square area, according to one embodiment.

FIG. 3 illustrates programming of an exemplary irregular watering pattern made possible by the irrigation systems disclosed herein, according to one embodiment. In FIG. 3, sprinklers 12 is programmed according to an Angle-Range program using a predefined angle step of 15°, to water a 200 foot by 200 foot square field. As shown in the table, a first effective watering range is programmed for each sector, defined by a first node positioned on the perimeter of the watering field. Range interpolation determines the type of interpolation for the interval between nodes (e.g., linear, spline, concave, convex, quadratic, etc.) Nodes 1-11 are defined on the perimeter of the watering field, defining sectors located between lines connecting the watering source (e.g., sprinkler 12) and the node. For example, a first rectangular sector is defined by the boundaries between sprinkler 12-node 1, node 1-node 2, and node 2-sprinkler 12. Shaded area 13 illustrates the area watered by sprinkler 12 operating according to the Angle-Range program. Area 14 illustrates the area not watered by sprinkler 12 operating according to the Angle-Range program. In frames of every sector rotation speed of sprinkler may be adjusted to guaranty uniform watering.

For example, a first node 1 is defined at 0° (relative to due north), corresponding to a sector spanning from 0° to 15° in the square field. Sprinkler 12 is programmed to spray water at an effective range of 100 feet within this first sector, to reach the top border of the square field. A second node 2 is defined on the boarder of the field at a 15° (from sprinkler 12, relative to due north), corresponding to a sector spanning from 15° to 30° in the square field. Sprinkler 12 is programmed to spray water at an effective range of 103.5 feet within this first sector, to reach the top border of the square field at 15°. Sprinkler 12 is programmed not to water sector six, corresponding to angles ranging from 60° to 90°, as illustrated.

In some embodiments, an irrigation system is programmed according to time and/or sprinkler rotation speed and effective watering range (e.g., a Time-Range program/Time-Range-Speed program), rather than angle and range (e.g., an Angle-Range program/Angle-Range-Speed program). For example, for a rotating sprinkler has a constant speed of rotation, the amount or range of water spray is adjusted to provide the same amount of water to any point of the irrigated area or when amount of water is changed together with watered radius—uniformity of watering is guaranteed/provided by adjustment of sprinkler rotation speed.

In some embodiments the irrigation system (e.g., sprinkler) is programmed to take the terrain (e.g., slope(s), hill(s), and hollow(s)) into account. This is accomplished, for example, by adjusting the range of water spray and the watering time (e.g., speed of the sprinkler rotation). The data on terrain profile may be entered manually, from a remote control, or automatically from an electronic map of the terrain. E.g., calculated from an electronic map by special software or prepared by any other way.

In other embodiments the irrigation system is programmed to account for wind velocity (e.g., speed and direction). Wind velocity may be entered manually, obtained from a local measuring device in communication (e.g., wired or wirelessly) with the irrigation system, or obtained from a remote server (e.g., maintained by a weather service) storing recently measured or forecasted wind velocity.

In one embodiment, the irrigation system includes a group of sprinklers programmed together, to work as an integrated unit. In this fashion, individual sprinklers can be programmed not to water portions of a potential irrigation field (e.g., roads, fields that are not planted, etc.) and/or not to water edges (e.g., borders) between areas covered by neighboring sprinklers.

In some embodiments, the effective watering range is controlled by a control valve that modulates water pressure, e.g., with one or more adjustable nozzle or one or more nozzle with an adjustable trajectory, or by any other known means. In some embodiments, uniformity of watering is provided by adjustment of rotation speed of sprinkler.

In some embodiments, a sprinkler includes more than one nozzle and/or more than one watering head, to enable watering of irregular fields. In some embodiments, a sprinkler with several nozzles and/or heads has separate programs for each nozzle and/or head.

FIG. 4 illustrates an exemplary irregular water pattern obtainable according to the irrigation systems, methods, and programs provided herein. The watering area is defined by nodes (A-H) 1 on perimeter 2 of the irrigation field. Sprinkler 4 ("o") is programmed to water an irregular shaped area 3 (shaded area), including regions with concave borders (e.g., the sector bound by points OGH), convex borders (e.g., the sector bound by points ODE), and carve outs (e.g., areas including boundary points b-c and d-e). The sprinkler has a maximum effective range as defined by perimeter 5. Outside points 6 (a and f) of an exemplary watering trajectory 7 within the programmed watering scheme, as well as internal borders (b, c, d, and e) are illustrated as a cross-section of the watering stream 8, below the illustration of the irrigation field. Internal water-free areas 9 (e.g., watering carve-outs) within the irrigation zone (e.g., irrigation field) are illustrated as non-shaded areas. Internal watering boundaries 10 define the non-watered carve-out regions. Trajectory 11 of that part of watering stream from the sprinkler, which passes over internal water-free area to that part of the surface of the irrigated zone, which is located trans-water-free area, when looking from the side of the sprinkler.

In some embodiments, the Angle-Range program may be derived from an electronic map or scheme by special software or calculated from a paper map or scheme. In other embodiments, the program is manually prepared and/or input (e.g., at the irrigation system or sprinkler).

In some embodiments, as illustrated in FIG. 5, a sprinkler 501 includes a graduated limb 502 to measure angles. The limb is marked with a scale 503 (e.g., in degrees or minutes) to assist with angle measurements. In some embodiments, limb 502 is detachable. In some embodiments, limb 502 is used to prepare a Range-Angle program by facilitating measurement of watering ranges at various angles. In some embodiments, the watering ranges are measured using, e.g., a tape measure 504 or similar means. In some embodiments, internal edge 505 limb 502 is configured as an attachment point for tape measure 504.

In some embodiments, a rangefinder 604 (e.g., a laser, ultrasonic, optical, or other rangefinder) and, optionally, a benchmarking device 602, are used to measure angles and watering ranges, in order to program the disclosed irrigation systems (e.g., including sprinkler 601), as illustrated in FIG. 6. For example, benchmarking device 602 is used to make a base measurement 3 for determining angles between sprinkler 601 and rangefinder 604 (e.g., positioned at a node on the perimeter of an irregular irrigation field. In some embodiments, benchmarking device 602 includes a base 602-a (e.g., a stick that can be stuck into the ground) and a head 602-*b* used for targeting rangefinder 604. In some embodiments, head 602-*b* of the benchmark is rotatable about the base and/or the base is telescoping, to enable fixing the rangefinder at a desired height. In some embodiments, sprinkler 601 is equipped with a similar head, to facilitate measurements with rangefinder 604 and benchmarking device 602.

As illustrated in FIG. 6, benchmark 602 is placed at a distance 603 from sprinkler 601 (e.g., in the direction defined as the starting direction for the sprinkler's program, e.g., at a 0° angle). Distance 603 between benchmark 602 and sprinkler 601 is determined (e.g., by careful measurement). In some embodiments, benchmark 602 is placed on the perimeter of an irregular irrigation field. Rangefinder 604 is then moved along the perimeter of the irregular irrigation field, to take a plurality of measurements to define the range and angle of a plurality of points along the perimeter of the irregular irrigation field. In some embodiments, continuous measurements are taken along the perimeter. In some embodiments, periodic measurements are taken along the perimeter. In some embodiments, measurements are taken at least at positions on the perimeter that will be used as nodes for the irrigation program.

As illustrated in FIG. 6, sprinkler 601, benchmark 602, and rangefinder 604 form a triangle with known/measured sides (e.g., sides 603, 605, and 606 when rangefinder 604 is at position 604-1), allowing triangulation of the range and angle of water spray needed to irrigate the irregular field. The rangefinder is moved from position 604-1 to position 604-2 and the process is repeated, using sides 603, 608, and 609. Distance 610 between position 604-1 and position 604-2 defines a portion of the perimeter of the irregular irrigation field. As described above, the shape of this portion of the perimeter may be interpolated with a linear, concave, convex, or other shape, as needed to better define the watering area of the program. In some embodiments, the points defining the perimeter of the irrigation field are determined in a clockwise or counterclockwise fashion, starting from the reference point (e.g., the position of benchmark 602).

In some embodiments, an adjustment can be provided by "ranging fire." In this case the user manually (e.g., with a remote control or control panel on the sprinkler) sets an angle and a range, tests if the range is suitable to water the desired area and adjusts it, if necessary, to water the desired area. All key points (e.g., nodes) of the irrigated area perimeter are processed in this way and added to the sprinkler's Angle-Range program (and/or Angle-Range-Speed program).

In some embodiments, these adjustments (e.g., node settings) can be provided by direction finding (DF) or radio direction finding (RDF) methods. Several radio beacons are installed and the user's position moving with an automatic direction finder along the border of the irrigated area is determined by triangulation. If the beacons are potent enough this method is suitable to define perimeters for each of a large group of sprinklers irrigating a large field.

In some embodiments, positioning devices (e.g., employing GPS or GNSS (Global Navigation Satellite System) systems) are used to define a perimeter of the irregular irrigation field. In some embodiments, the user moves along the border of the irrigated area, taking measurements at key points (e.g., nodes) to increase the accuracy of measurements. In some embodiments, this is achieved using a smartphone including small inertial measurement units (IMUs), proximity sensors, barometers, and/or GPS/GNSS.

In some embodiments, points along the perimeter may be further adjusted manually (e.g., by ranging fire).

In yet other embodiments, the perimeter of the irregular irrigation field is defined using an alternate means, e.g., by geodesy and/or cartography.

As described herein, the present disclosure allows more efficient irrigation of large and irregular-shaped fields using fewer sprinklers, by customizing the trajectory of water steams at different angles along the perimeter of the irrigation field. These methods and systems require significantly lower installation costs and shorter installation periods. This is realized, for example, in the watering of agricultural fields and/or golf courses.

Conventionally, square fields are irrigated with even, 360° circular watering, as illustrated in FIG. 7. There are two major patterns, conventionally used for this purpose, square patterning, as illustrated in FIG. 8, and triangular patterning, as illustrated in FIG. 9. However, both patterns leave significant portions 801, 901, and 903 of the agricultural field unwatered and, thus, unusable. Use of the irrigation systems described herein (e.g., which enable edge-to-edge watering of irregular shapes, including squares) provides for 27.4% more irrigated area, as compared to conventional square watering patters (e.g., the ratio of area 801 to area 802 in FIG. 8); 10.3% more irrigated area in the center of a conventional triangular watering pattern (e.g., the ratio of area 903 to area 902 in FIG. 9), and 18.9% more irrigated area along the border of a conventional triangular watering pattern (e.g., the ratio of area 901 to area 902 in FIG. 9).

In one aspect, the disclosure provides a programmable sprinkler(s), which can be adjusted/regulated to water zone/area of any form/shape, providing/applying water to desired surface of the watered zone. Regulation/adjustment may be provided by sprinkler nozzle(s) (one or more) and/or sprinkler head(s) (one more), and/or pressure-regulating device(s) (one or more).

In some embodiments, system is able to irrigate area of any arbitrary shape. The sprinkler is programmable to have different range of watering at different angle (direction) depending on the shape of the irrigated zone. Range-Angle (or Range-Angle-Speed) program can be entered manually at the site or from remote control. Remote control may be represented by any device connected to the sprinkler by wire or wirelessly. It may be any special device as well as a computer, notebook, tablet, smartphone, etc. with special software installed. The program may be also calculated by special software from the map or scheme of the irrigated zone. Watering range may be changed by using control valve(s) that change(s) pressure (or switch on/of water in case of beam-type sprinkler with multiple spraying units), adjustable nozzle or nozzle with changeable trajectory or by all these means and/or any other mean or any combination of them.

In some embodiments, the irrigation system operates according to a Time-Rotation and Speed-Range program, where speed of rotation and range of watering are changed according to a predefined program.

In some embodiments, the irrigation system operates without a predefined Time-Rotation and Speed-Range program. The sprinkler may change watering time, speed and/or range upon reaching some angle which is determined by sensors and sensor integration.

In some embodiments, the irrigation system accounts for a terrain profile, including for provision and/or for maintaining of uniform watering.

In some embodiments, sprinklers in the disclosed irrigation systems include several or multiple nozzles, water-spraying units and/or heads, which is/are able to leave dry zones of any shape inside the irrigated area, including for provision and/or for maintaining of uniform watering.

In some embodiments, the irrigation system accounts for wind strength and direction, including for provision and/or for maintaining of uniform watering.

In some embodiments, a Time-Range or Time-Range-Speed adjustment is used instead of (or together with) Range-Angle or Range-Angle-Speed adjustment for regulation of sprinkler's operation/functioning, including for provision and/or for maintaining of uniform watering.

In some embodiments, the irrigation system is a group sprinklers/water-spraying units managed from a single program (e.g., remote control) to work as a unit.

In some embodiments, the irrigation systems are adjustable to water zone/area of any form/shape, providing/applying water to desired surface of the watered zone, being framed/bordered by the specified perimeter line of this watered/irrigated zone.

In some embodiments, the perimeter of an irrigation field is defined by moving a point-marking device(s) lengthwise along the border line (perimeter line of the watered zone), either walking or moving it/them, using any transport, or using dron(s) (which are self-operated and/or manually-operated, and/or system-operated to fulfill specified task).

In some embodiments, the irrigation system accounts for a terrain of the irrigation field (e.g., a slope, hill, and/or hollow (local or not)) when watering/irrigation, having possibility to water/irrigate, maintaining given/specified/determined characteristics of watering/irrigation, including for provision of the same uniformity, matching, watering specified zone in frames of perimeter border line and/or so on.

In some embodiments, the irrigation system includes a rangefinder (e.g., laser, ultrasonic, optical or other) and a benchmarking device enabling the sprinkler to adjust itself and/or to be adjusted to irregular perimeter line of the watered/irrigated zone by triangulation where distance to the sprinkler and to the benchmark are measured for each of the points defining perimeter of the irrigated zone and the distance between the sprinkler and benchmark is known, the direction from the sprinkler to the benchmark is used as a reference direction, perimeter points are visited in clockwise or counterclockwise order.

In some embodiments, a sprinkler includes a graduated limb to measure angles. The limb may be detachable. The limb is used to prepare the Range-Angle or Range-Angle-Speed program by measuring desired ranges at different angles. The ranges may be measured by tape measure or any other similar device. In some embodiments, the internal edge of the limb is attachable to the end of a tape measure.

In some embodiments, the irrigation system is adjustable by the "ranging fire" approach. The user manually (with remote control or control panel of the sprinkler) sets an angle and a range, tests if the range is suitable to water the desired area and adjusts it to be suitable to water the desired area. All key points of the irrigated area perimeter are processed in this way and added to the sprinkler's Angle-Range program or Angle-Range-Speed program.

In some embodiments, the border (e.g., perimeter) of the irrigated zone and the sprinkler's position is defined by methods of Direction Finding (DF), or radio direction finding (RDF). Several radio beacons are installed and the user's position moving with an automatic direction finder along the border of the irrigated area is determined by triangulation. If the beacons are potent enough this method is suitable to define perimeters for each of a large group of sprinklers irrigating a large field. The sprinkler may have a special place to attach an automatic direction finder.

In some embodiments, the border (e.g., perimeter) of the irrigated zone and the sprinkler's position is defined by positioning devices using GPS/GNSS (Global Navigation Satellite Systems). In this case the user is also moving along the border of the irrigated area, making stops in key points to increase the accuracy of measurements. Smartphones that may include small inertial measurement units (IMUs), proximity sensors, barometers, and GPS/GNSS may be also used. If the accuracy is not sufficient further adjustments may be made by using "ranging fire" approach described earlier. The sprinkler may have a special place to attach a GPS/GNSS receiver or smartphone.

In one aspect, the disclosure provides an irrigation technology with programmable sprinkler(s) (i.e. any devices for watering on the distance, hereinafter named as sprinkler(s) [including, but not limited to, like spraying sprinkler head or watch-hand-type beam with multiple controlled/smart-controlled sprayers/sprinkler devices along it]), which can be adjusted/regulated to water zone/area of any form/shape, providing/applying water to desired surface of the watered zone, being framed/bordered by the specified perimeter line of this watered/irrigated zone.

Exemplary Embodiments

In one aspect, the disclosure provides a system for irrigating an irregularly shaped area, including a first rotating sprinkler an electronic device in wired or wireless communication with the rotating sprinkler. The electronic device has one or more processors and a memory, the memory storing a description of a first plurality of watering sectors associated with the first rotating sprinkler, the description including a plurality of watering parameters.

In some embodiments, the description of the first plurality of watering sectors includes a series of node positions defining a perimeter of the irregularly shaped irrigation area. In some embodiments, the description of the first plurality of watering sectors also includes defined paths between neighboring nodes on the perimeter of the irregularly shaped irrigation area. In other embodiments, the description of the first plurality of watering sectors includes one or more functions for interpolating a path between neighboring nodes.

In some embodiments, the description of the first plurality of watering sectors includes a hard code as a series of step functions, defining key pairs of a range of watering trajectory and an angle of rotation. In certain embodiments, the description of the first plurality of watering sectors serves as both a description of the watering sections and corresponding watering parameters.

The memory also includes non-transitory instructions which, when executed by the one or more processors, cause the first rotating sprinkler to: irrigate each respective watering sector in the first plurality of watering sectors associated with the first rotating sprinkler according to a corresponding watering parameter in the plurality of watering parameters, wherein the first rotating sprinkler irrigates each respective watering sector in the plurality of watering sectors by rotating through a different rotational angle range/angle-range-speed corresponding to the respective watering sector. A range of a watering trajectory in a first watering sector in the first plurality of watering sectors is varied as a function of a first rotational angle of the first rotating sprinkler through the first watering sector in accordance with the watering parameter corresponding to the first watering sector, thereby irrigating an irregularly shaped area.

In one embodiment, each watering sector in the plurality of watering sectors has an area defined by three boundaries, the first boundary consisting of a straight path between the first rotating sprinkler and a first node on the perimeter of the irregularly shaped area, the second boundary consisting of a path between the first node and a second node on the perimeter of the irregularly shaped area, and the third boundary consisting of a straight path between the first rotating sprinkler and the second node. The description of the first plurality of watering sectors includes (i) a position of the first node, (ii) a position of the second node, and (iii) the path between the first node and the second node in the form of a watering parameter in the plurality of watering parameters. In some embodiments, node position is stored in memory as a key pair of a rotational angle and a maximum watering distance (range of trajectory).

The corresponding watering parameter for each respective watering sector in the plurality of watering sectors causes the first rotating sprinkler to: water, in a first direction towards the first node, with a first watering trajectory calculated to have a maximum range corresponding to the distance between the first rotating sprinkler and the first node, while continuing to water, rotate towards the second node, in accordance with a corresponding rotational angle for the respective watering sector, and water, in a second direction towards the second node, with a second watering trajectory calculated to have a maximum range corresponding to the distance between the first rotating sprinkler and the second node. A watering trajectory of the first rotating sprinkler is varied as a function of the corresponding rotational angle during rotation towards the second node when the path between the first node and the second node is not an arc having a radius equal to the distance between the sprinkler and the first node.

In one embodiment, the disclosure provides a system for irrigating an irregularly shaped area (e.g., shaded area 3 in FIG. 2), including a first rotating sprinkler (e.g., rotating sprinkler "o" 102 in FIG. 2) and an electronic device (e.g., a computer, a portable electronic device, a smartphone, a watering control panel, etc.). The electronic device is in wired or wireless communication with the rotating sprinkler. The electronic device having one or more processors and a memory, the memory comprising programmable non-transitory instructions which, when executed by the one or more processors, cause the first rotating sprinkler to: irrigate each respective watering sector (e.g., a watering sector defined by the portion of shaded area 3 bound between points AOB) in a first plurality of watering sectors (e.g., which together make-up the entirety of shaded area 3 in FIG. 2) associated with the first rotating sprinkler according to a corresponding watering parameter in a plurality of watering parameters (e.g., where each watering sector is watered differently based on at least the shape of the watering sector).

The first rotating sprinkler irrigates each watering sector in the plurality of watering sectors by rotating through a corresponding rotational angle. For example, when watering the watering sector defined by the portion of shaded area 3 bound between points AOB, sprinkler "o" 102 begins facing towards, e.g., point A and rotates towards point B, as illustrated in FIG. 2.

A range of a watering trajectory in a first watering sector in the first plurality of watering sectors is varied as a function of a first rotational angle of the first rotating sprinkler through the first watering sector in accordance with the watering parameter corresponding to the first watering sector, thereby irrigating an irregularly shaped area. For example, when facing point A, sprinkler "o" 102 waters with a range of watering trajectory that reaches outer perimeter 4, and then as sprinkler "o" rotates towards point B, the range of watering trajectory is gradually reduced such that only shaded area 3 is watered, as illustrated in FIG. 2.

In some embodiments, each watering sector in the plurality of watering sectors has an area defined by three boundaries, the first boundary consisting of a straight path between the sprinkler and a first node on the perimeter of the irregularly shaped area (e.g., a line between sprinkler "o" 102 and node A in FIG. 2), the second boundary consisting of a path between the first node and a second node on the perimeter of the irregularly shaped area (e.g., path 2 between node A and node B in FIG. 2), and the third boundary consisting of a straight path between the sprinkler and the second node (e.g., a line between node B and sprinkler "o" 102 in FIG. 2). The corresponding watering parameter for each watering sector in the plurality of watering sectors causes the rotating sprinkler to water, in a first direction towards the first node (e.g., water while pointed towards node A), with a first watering trajectory calculated to have a maximum range corresponding to the distance between the sprinkler and the first node (e.g., such that water reaches to node A), while continuing to water, rotate towards the second node, in accordance with a corresponding rotational angle for the watering sector (e.g., rotate the sprinkler towards node B), and water, in a second direction towards the second node, with a second watering trajectory calculated to have a maximum range corresponding to the distance between the sprinkler and the second node (e.g., such that water reaches node B, but not beyond). Where a watering trajectory and/or rotation speed is/are varied and/or adjusted as a function of the corresponding rotational angle during rotation towards the second node if the path between the first node and the second node is not an arc having a radius equal to the distance between the sprinkler and the first node. For example, as illustrated in FIG. 2, when rotating from node A to node B, sprinkler "o" 102 gradually reduces the range of the watering trajectory because the path (e.g., boundary 2) between node A and node B is a straight line. In contrast, when rotating from node D to node E, sprinkler "o" 102 does not vary a range of the watering trajectory because all points along the path from node D to node E are equidistant from the sprinkler.

In some embodiments, at least one watering sector in the plurality of watering sectors comprises a straight path between the first node and the second node (e.g., path 2 between node A and node B, as illustrated in FIG. 2). In some embodiments, at least one path between nodes has a concave shape (e.g., path 2 between node G and node H in FIG. 2). In some embodiments, at least one path between nodes has a convex shape (e.g., path 2 between node B and node C, in FIG. 2). In some embodiments, at least one path between nodes has a parabolic shape (e.g., path 2 between node B and node C, in FIG. 2).

In some embodiments, the plurality of watering sectors define a square or rectangular area (e.g., as illustrated in FIG. 3).

In some embodiments, at least one watering parameter in the plurality of watering parameters causes the rotating sprinkler to vary and/or adjust a rotation speed of the sprinkler (e.g., to avoid overwatering an area irrigated by more than one sprinkler in the irrigation system). For example, in some embodiments, the system for irrigating an irregularly shaped area includes a first sprinkler programmed to irrigate a first watering sector, and a second sprinkler programmed to irrigate a second watering sector, where the second watering sector partially overlapping with the first water sector. A rotation speed of at least one of the first sprinkler and the second sprinkler is increased while watering the corresponding first or second watering sector.

In some embodiments, the rotating sprinkler has a first nozzle and a second nozzle (e.g., a plurality of nozzles) having a same orientation. A first range of a first watering trajectory corresponding to the first nozzle is controlled separately from a second range of a second watering trajectory corresponding to the second nozzle (e.g., as illustrated in the side view in FIG. 4, sprinkler "o" has two nozzles creating a first watering trajectory reaching internal border d and a second watering trajectory reaching outer border f). At least one watering parameter in the plurality of watering parameters causes the rotating sprinkler to vary at least one of the first range the first watering trajectory and the second range of the second watering trajectory to create a discontinuous watering stream (e.g., as illustrated in FIG. 4, sprinkler "o" creates a discontinuous watering stream that does not irrigate the area between inner boundaries d and e).

In some embodiments, at least one watering parameter in the plurality of watering parameters causes the rotating sprinkler to vary a first range of a first watering trajectory to account for a change in elevation within a watering sector (e.g., increasing a range of watering trajectory to reach a point on a hill within the irrigation field or decreasing a range of watering trajectory to reach an equidistant point within a ravine within the irrigation field).

In some embodiments, at least one watering parameter in the plurality of watering parameters causes the rotating sprinkler to vary a first range of a first watering trajectory to account for a wind velocity (e.g., increase a range of watering trajectory when spraying water into the wind and/or decrease a range of watering trajectory when spraying water with the wind).

In some embodiments, programming the plurality of watering parameters comprises defining an irrigation field on an electronic map (e.g., outlining an area in an electronic map of an irrigation field on a computer or portable electronic device).

In some embodiments, programming the plurality of watering parameters comprises manually inputting a plurality of nodes and a plurality of path interpolations, wherein each node in the plurality of nodes is defined by a distance from a sprinkler and an angle relative to a reference line extending outwards from the sprinkler, and wherein each path interpolation in the plurality of path interpolations defines a shape of a path between a first node and a second node in the plurality of nodes. For example, as illustrated in FIG. 3, inputting a plurality of nodes 1-11 at defined angles, with effective watering ranges (e.g., range of watering trajectories) and a form of interpolation for varying the effective watering ranges when moving from one node to the next.

In some embodiments, the electronic device in wired or wireless communication with the rotating sprinkler is attached to the rotating sprinkler (e.g., is built into the sprinkler).

In some embodiments, each watering parameter in the plurality of watering parameters defines one or more of a range of a watering trajectory, an adjustment of sprinkler rotation speed a starting angle, a terminal angle, an angle of rotation, a speed of rotation, a volumetric flow rate, and/or a shape or interpolation type of a path between a first node and a second node (e.g., linear, concave, convex, parabolic, etc).

In some embodiments, the irrigation system includes a plurality of rotating sprinkler heads attached to an elongated support, wherein at least a first respective rotating sprinkler head in the plurality of rotating sprinkler heads is in electronic communication with the electronic device having the one or more processors and a memory, the memory storing a description of a first plurality of watering sectors associated with the first rotating sprinkler head.

In some embodiments, the sprinkler is represented by water-spraying device(s)/unit(s), located along foldable or fixed construction beam(s), as watch-hand-type beam (or beam with fixation/connection in its center) with multiple controlled/smart-controlled sprayers/sprinkler devices along it or by water-spraying device(s)/unit(s), located in the center of watered area (as spraying sprinkler head(s)).

In some embodiments, the non-transitory instructions, when executed by the one or more processors, cause the first rotating sprinkler to uniformly water the first watering sector in the plurality of watering sectors by varying at least one of a water pressure and a rotational speed of the rotating sprinkler as a function of a first rotational angle of the first rotating sprinkler through the first watering sector in accordance with the watering parameter corresponding to the first watering sector.

In some embodiments, uniform watering is provided by smart-regulation of water pressure in sprinkler head together with smart-regulation of sprinkler head rotation speed for every angle/distance of watering and/or by adjustment/re-switching of spraying unit of sprinkler head.

In one aspect, the disclosure provides a method for irrigating an irregularly shaped area, comprising: at an irrigation system having a rotating sprinkler and an electronic device in wired or wireless communication with the rotating sprinkler, the electronic device having one or more processors and memory: defining an irrigation perimeter comprising two or more points that are not equidistant from the sprinkler, wherein the area between the sprinkler and the irrigation perimeter comprise s a plurality of watering sectors; defining respective watering parameters in a plurality of watering parameters, each watering parameter in the plurality of watering parameters corresponds to a watering sector in the plurality of watering sectors, wherein the watering parameters include a range of a watering trajectory and a rotational speed; and irrigating each watering sector in the plurality of watering sectors according to its corresponding watering parameter.

In some embodiments, irrigating each watering sector in the plurality of watering sectors includes uniformly watering the first watering sector in the plurality of watering sectors by varying at least one of a water pressure and a rotational speed of the rotating sprinkler as a function of a first rotational angle of the first rotating sprinkler through the first watering sector in accordance with the watering parameter corresponding to the first watering sector.

In some embodiments, uniform watering is provided by smart-regulation of water pressure in sprinkler head together with smart-regulation of sprinkler head rotation speed for every angle/distance of watering and/or by adjustment/re-switching of spraying unit of sprinkler head.

CONCLUDING REMARKS

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

Memory optionally includes high-speed random access memory and optionally also includes non-volatile memory, such as one or more magnetic disk storage devices, flash memory devices, or other non-volatile solid-state memory devices. Access to memory by other components of device, such as one or more processors and a peripherals interface, is, optionally, controlled by a memory controller.

A peripherals interface can be used to couple input and output peripherals of the device to one or more processors and memory. The one or more processors run or execute various software programs and/or sets of instructions stored in memory to perform various functions for device and to process data.

Each of the above identified modules and applications correspond to a set of executable instructions for performing one or more functions described above and the methods described in this application (e.g., computer-implemented methods). These modules (i.e., sets of instructions) need not be implemented as separate software programs, procedures or modules, and thus various subsets of these modules are, optionally, combined or otherwise re-arranged in various embodiments. In some embodiments, memory optionally stores a subset of the modules and data structures identified above. Furthermore, memory optionally stores additional modules and data structures not described above.

Accordingly, in other embodiments, the present disclosure provides electronic devices including one or more processors, memory, and optionally a display, where the memory includes instructions for performing all or a portion of one or more methods described herein.

In other embodiments, the present disclosure provides computer readable storage medium (e.g., non-transitory medium) storing one or more programs, the one or more programs including instructions, which when executed by an electronic device with one or more processors and optionally a display, cause an irrigation system associated with the device to perform all or a portion of one or more methods described herein.

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, without changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, and/or components thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A system for irrigating an irregularly shaped area, comprising:

a first rotating sprinkler, and an electronic device in wired or wireless communication with the rotating sprinkler, the electronic device having one or more processors and a memory, the memory storing a description of a first plurality of watering sectors associated with the first rotating sprinkler, the description including a plurality of watering parameters, the memory further comprising non-transitory instructions which, when executed by the one or more processors, cause the first rotating sprinkler to:

irrigate each respective watering sector in the first plurality of watering sectors associated with the first rotating sprinkler according to a corresponding watering parameter in the plurality of watering parameters, wherein the first rotating sprinkler irrigates each respective watering sector in the plurality of watering sectors by rotating through a different rotational angle range corresponding to the respective watering sector, wherein a range of a watering trajectory in a first watering sector in the first plurality of watering sectors is varied as a function of a first rotational angle of the first rotating sprinkler through the first watering sector in accordance with the watering parameter corresponding to the first watering sector, thereby irrigating an irregularly shaped area.

2. The system for irrigating an irregularly shaped area according to claim 1, wherein:

each watering sector in the plurality of watering sectors has an area defined by three boundaries, the first boundary consisting of a straight path between the first rotating sprinkler and a first node on the perimeter of the irregularly shaped area, the second boundary consisting of a path between the first node and a second node on the perimeter of the irregularly shaped area, and the third boundary consisting of a straight path between the first rotating sprinkler and the second node, and wherein the description of the first plurality of watering sectors includes (i) a position of the first node, (ii) a position of the second node, and (iii) the path between the first node and the second node in the form of a watering parameter in the plurality of watering parameters; and the corresponding watering parameter for each respective watering sector in the plurality of watering sectors causes the first rotating sprinkler to:

water, in a first direction towards the first node, with a first watering trajectory calculated to have a maximum range corresponding to the distance between the first rotating sprinkler and the first node, while continuing to water, rotate towards the second node, in accordance with a corresponding rotational angle for the respective watering sector, and water, in a second direction towards the second node, with a second watering trajectory calculated to have a maximum range corresponding to the distance between the first rotating sprinkler and the second node, wherein a watering trajectory of the first rotating sprinkler is varied as a function of the corresponding rotational angle during rotation towards the second node when the path between the first node and the second node is not an arc having a radius equal to the distance between the sprinkler and the first node.

3. The system for irrigating an irregularly shaped area according to claim 1, wherein at least one watering sector in the plurality of watering sectors comprises a straight path between the first node and the second node.

4. The system for irrigating an irregularly shaped area according to claim 1, wherein the plurality of watering sectors define a square or rectangular area.

5. The system for irrigating an irregularly shaped area according to claim 1, wherein at least one watering parameter in the plurality of watering parameters causes the rotating sprinkler to vary a rotation speed of the sprinkler.

6. The system for irrigating an irregularly shaped area according to claim 5, comprising:
a first sprinkler programmed to irrigate a first watering sector, and
a second sprinkler programmed to irrigate a second watering sector, the second watering sector partially overlapping with the first water sector,
wherein a rotation speed of at least one of the first sprinkler and the second sprinkler is increased while watering the corresponding first or second watering sector.

7. The system for irrigating an irregularly shaped area according to claim 1, wherein:
the rotating sprinklers comprises a first nozzle and a second nozzle having a same orientation,
a first range of a first watering trajectory corresponding to the first nozzle is controlled separately from a second range of a second watering trajectory corresponding to the second nozzle, and
at least one watering parameter in the plurality of watering parameters causes the rotating sprinkler to vary at least one of the first range the first watering trajectory and the second range of the second watering trajectory to create a discontinuous watering stream.

8. The system for irrigating an irregularly shaped area according to claim 1, wherein at least one watering parameter in the plurality of watering parameters causes the rotating sprinkler to vary a first range of a first watering trajectory to account for a change in elevation within a watering sector.

9. The system for irrigating an irregularly shaped area according to claim 1, wherein at least one watering parameter in the plurality of watering parameters causes the rotating sprinkler to vary a first range of a first watering trajectory to account for a wind velocity.

10. The system for irrigating an irregularly shaped area according to claim 1, wherein programming the plurality of watering parameters comprises defining an irrigation field on an electronic map.

11. The system for irrigating an irregularly shaped area according to claim 2, wherein programming the plurality of watering parameters comprises manually inputting a plurality of nodes and a plurality of path interpolations,
wherein each node in the plurality of nodes is defined by a distance from a sprinkler and an angle relative to a reference line extending outwards from the sprinkler, and
wherein each path interpolation in the plurality of path interpolations defines a shape of a path between a first node and a second node in the plurality of nodes.

12. The system for irrigating an irregularly shaped area according to claim 1, wherein the electronic device in wired or wireless communication with the rotating sprinkler is attached to the rotating sprinkler.

13. The system for irrigating an irregularly shaped area according to claim 1, wherein each watering parameter in the plurality of watering parameters defines one or more of a range of a watering trajectory, a starting angle, a terminal angle, an angle of rotation, a speed of rotation/an adjustment of rotation speed, a volumetric flow rate, and a shape or interpolation type of a path between a first node and a second node.

14. The system for irrigating an irregularly shaped area according to claim 1, comprising a plurality of rotating sprinkler heads attached to an elongated support,
wherein at least a first respective rotating sprinkler head in the plurality of rotating sprinkler heads is in electronic communication with the electronic device having the one or more processors and a memory, the memory storing a description of a first plurality of watering sectors associated with the first rotating sprinkler head.

15. The system for irrigating an irregularly shaped area according to claim 1, wherein the non-transitory instructions, when executed by the one or more processors, cause the first rotating sprinkler to:
uniformly water the first watering sector in the plurality of watering sectors by varying at least one of a water pressure and a rotational speed of the rotating sprinkler as a function of a first rotational angle of the first rotating sprinkler through the first watering sector in accordance with the watering parameter corresponding to the first watering sector.

16. A method for irrigating an irregularly shaped area, comprising:
at an irrigation system having a rotating sprinkler and an electronic device in wired or wireless communication with the rotating sprinkler, the electronic device having one or more processors and memory:
defining an irrigation perimeter comprising two or more points that are not equidistant from the sprinkler, wherein the area between the sprinkler and the irrigation perimeter comprises a plurality of watering sectors;
defining respective watering parameters in a plurality of watering parameters, each watering parameter in the plurality of watering parameters corresponds to a watering sector in the plurality of watering sectors, wherein the watering parameters include a range of a watering trajectory and a rotational speed; and irrigating each watering sector in the plurality of watering sectors according to its corresponding watering parameter.

17. The method for irrigating an irregularly shaped area according to claim 14, wherein irrigating each watering sector in the plurality of watering sectors comprises:
uniformly watering the first watering sector in the plurality of watering sectors by varying at least one of a water pressure and a rotational speed of the rotating sprinkler as a function of a first rotational angle of the first rotating sprinkler through the first watering sector in accordance with the watering parameter corresponding to the first watering sector.

\* \* \* \* \*